Figure 1:
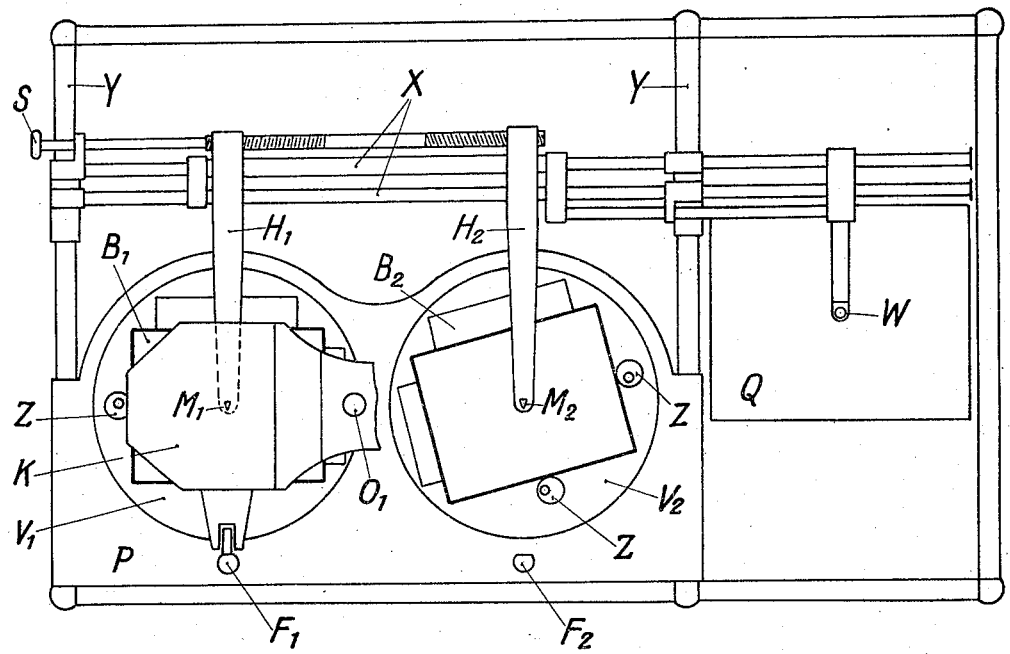

Oct. 13, 1931.   R. HUGERSHOFF   1,827,473
TRACING APPLIANCE FOR PAIRS OF MEASURING PICTURES
Filed Aug. 30, 1929   2 Sheets-Sheet 1

Inventor:
R. Hugershoff

Patented Oct. 13, 1931

1,827,473

UNITED STATES PATENT OFFICE

REINHARD HUGERSHOFF, OF DRESDEN, GERMANY, ASSIGNOR TO THE FIRM IKARUS INTERNATIONALE PATENTVERWERTUNGS - AKTIEN - GESELLSCHAFT, OF VADUZ, LIECHTENSTEIN

TRACING APPLIANCE FOR PAIRS OF MEASURING PICTURES

Application filed August 30, 1929, Serial No. 389,589, and in Germany September 10, 1928.

This invention relates to the construction of a mirror stereoscope of the Helmholtz type for measuring purposes. For the adjusting of any desired points of the space model obtained from the consideration of the two individual views arranged in one plane there are employed in a known manner two real measuring marks connected with one another, one of which slides directly over the left-hand image plane and the other over the right-hand image plane.

Now the invention consists firstly in the fact that the two measuring marks, the distance apart of which is adjustable, are rigidly connected with an implement, more particularly a recording stylus, and are moved with it by means of a parallel motion, for instance a cross slide, to be actuated directly by hand, always in such a way that the line joining the two measuring marks remains parallel to itself. The implement, in particular the recording stylus, then slides over a drawing surface, the plane of which is parallel to the common plane of the two measuring pictures.

If with such a device, for instance when looking at aerial measuring photographs taken vertically at the same height, the space mark appearing at a definite apparent depth, with a definite distance between the two real measuring marks, is moved along the space model, the pencil will draw the layer line corresponding in perspective to this depth. In order to give rise to the spatial impression in photographs which have been taken from aircraft having a lateral drift, the two partial pictures are so arranged in their plane as to be rotatable at will in a known manner.

If the real measuring marks are then provided on their under side with suitable graving tools or similar devices, the perspective layer lines traversed can be fixed therewith upon the layer of the measuring pictures and made continuously visible as spatial structures in the space image.

A plan so obtained obviously constitutes only a sort of topographical sketch, for even with photographs taken in a truly vertical direction and with a horizontal basis a perspective displacement of the layer lines is obtained and an increasing scale with increasing height of portions of the surface of the land. For the exact dimensioning of the measuring pictures according to the process indicated, according to the present invention ground glass screens are provided in the image planes of the mirror stereoscope, and upon these screens the measuring pictures are projected from the back. The projecting appliances to be employed for this purpose must be tiltable and adjustable in space at will in a known manner relatively to the corresponding ground glass surfaces within the limits prescribed in practice, in order to give them, in a known manner by using three fixed points given in position and height, the correct position relatively to one another and to the surface of projection. In order to make the entire apparatus light and easy to handle, instead of the original photographs reductions thereof are preferably employed for the projection. In the case of the method of using the appliance just described, the adjusting of the distances between different layer lines is obviously no longer effected by altering the distance between the two real measuring marks but by moving the projecting apparatus nearer to or farther from the projection surfaces.

The adapting of sequence pictures to a pair of plates already oriented relatively to the horizontal may be facilitated according to the invention by completely removing the entire inspection stereoscope serving for looking at the photographs and consisting in the Helmholtz type of four rigidly arranged mirrors and two eye pieces, with which the left-hand photograph is presented to the left eye and the right-hand photograph to the right eye, and substituting for it another inspection stereoscope, which likewise consists of four rigidly arranged mirrors and two eye pieces of different focal lengths in which the left-hand picture is now presented to the right eye and the right-hand picture to the left eye.

Figure 2:
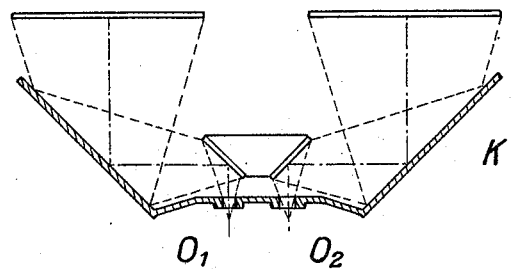
Figure 3:
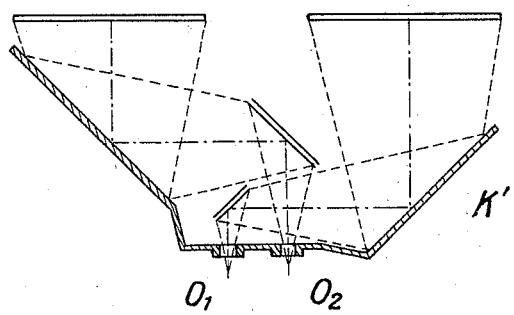
Figure 4:
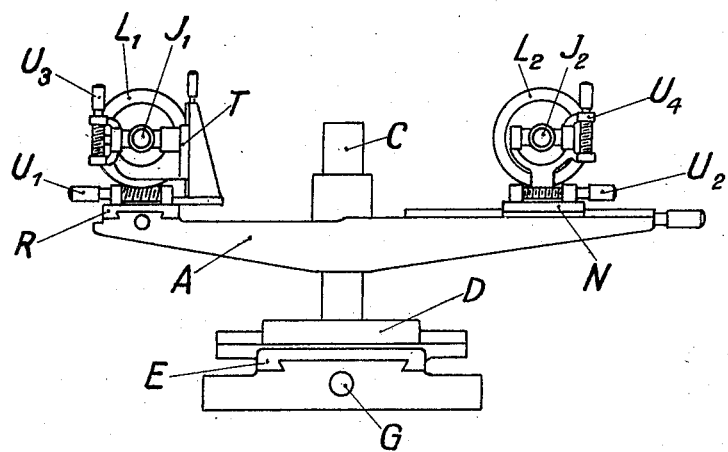
Figure 5:
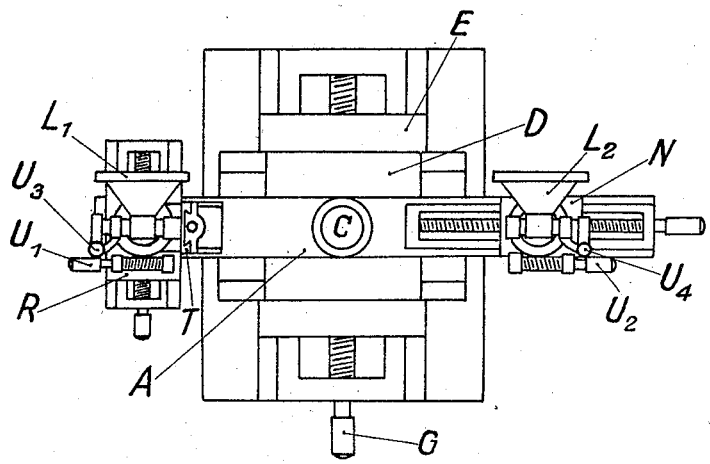

One constructional example of the invention is illustrated in the accompanying drawings in which:

Figure 1 shows a front elevation of the appliance,

Fig. 2 is a section through a mirror box which serves for viewing the picture surfaces or measuring marks in the appliance shown in Fig. 1, Fig. 3 is a section through a mirror box in which the passage of the rays is laterally reversed, Fig. 4 is a front elevation of a double projection device which is erected behind the plate holder of Figure 1 in order to enable oriented projections to be dealt with and Fig. 5 is a plan of the device shown in Fig. 4.

The appliance shown in Fig. 1 with its holder P, is to be regarded as vertical, for the two measuring pictures $B_1$ and $B_2$, which can be oriented at will in rotatable supports $V_1$ and $V_2$, and centred by means of eccentric sheaves Z. The measuring marks $M_1$ and $M_2$ are fitted to the underside of transparent holders $H_1$ and $H_2$, the distance apart of which is regulated by a screw S. The two holders $H_1$ and $H_2$ admit of being freely displaced together by hand by means of a cross slide consisting of slide rods Y and X. In this displacement a pencil W connected with the holder $H_2$ positively participates, the movements of this pencil tracing a line upon a drawing surface Q.

The picture surfaces B or the measuring marks $M_1$ and $M_2$ are inspected by means of eye pieces $O_1$ and $O_2$ in a mirror box K, which is shown in Figure 2, but only half shown in Figure 1. The mirror box K held in guides $F_1$ and $F_2$, can be changed for a mirror box K', shown in Figure 3, in which the passage of the rays is laterally reversed.

If in place of original pictures projections of such pictures oriented upon the ground glass screens lying in the image fields $B_1$ and $B_2$ are employed, a projection device to be erected behind the plate holder P is used, this being illustrated in front elevation in Figure 4 and in plan in Figure 5.

A base A is vertically displaceable on a column C. The column C itself admits of being displaced at will by means of slides D and E, the slide E preferably being actuated by a fine-movement screw G, which serves for measuring height. The base body comprises devices for regulating the size and direction of the distance between the centre points of the two projector objective lenses $J_1$ and $J_2$ of the projection chambers $L_1$ and $L_2$. These devices consist of an abscissa slide N, an ordinate slide R and a height slide T. The projection chambers $L_1$ and $L_2$, together with the measuring pictures to be inserted therein, preferably reduced in size, can be directed at will by means of drives $U_1$ and $U_2$ and inclined at will by means of drives $U_3$ and $U_4$. The twisting device for the measuring pictures to be projected is not shown in the drawings for the sake of simplicity, nor is the illuminating means thereof.

What I claim is:

1. A tracing device for pairs of measuring pictures, and more particularly for pairs of aerial photographs taken in a substantially vertical direction, comprising a mirror stereoscope, inspection eyepieces, two real measuring marks connected with one another, sliding directly over the image plane and displaceable independently of the inspection eyepieces, means for regulating the distance between the measuring marks, a marking implement such as a pencil, the measuring marks being rigidly connected with the marking implement and a parallel motion for moving the measuring marks and the marking implement collectively, to enable layer lines and situation lines to be obtained freehand and continuously from pairs of measuring pictures.

2. A tracing device for pairs of measuring pictures, and more particularly for pairs of aerial photographs taken in a substantially vertical direction, comprising a mirror stereoscope, inspection eyepieces, a marking implement such as a pencil, two real measuring marks connected with one another, sliding directly over the image plane and displaceable independently of the inspection eyepieces, the measuring marks being rigidly connected with the marking implement, means for regulating the distance between the measuring marks, a double projector connected with the mirror stereoscope and adapted to project self-oriented images of the measuring pictures into the plane of the measuring marks, to be measured in place of the original pictures, and a parallel motion for moving the measuring marks and the marking implement collectively, to enable layer lines and situation lines to be obtained freehand and continuously from pairs of measuring pictures.

3. A tracing device for pairs of measuring pictures, and more particularly for pairs of aerial photographs taken in a substantially vertical direction, comprising a mirror stereoscope consisting of four rigidly arranged mirrors and two eyepieces of different focal lengths, a marking implement such as a pencil, two real measuring marks connected with one another, sliding directly over the image plane and displaceable independently of the inspection eyepieces, the measuring marks being rigidly connected with the marking implement, means for regulating the distance between the measuring marks, and a parallel motion for moving the measuring marks and the marking implement collectively, to enable layer lines and situation lines to be obtained freehand and continuously from pairs of measuring pictures.

4. A tracing device for pairs of measuring pictures, and more particularly for pairs of aerial photographs taken in a substantially vertical direction, comprising a mirror stereoscope consisting of four rigidly arranged mirrors and two eyepieces of different focal lengths, a marking implement such as a pencil, two real measuring marks connected with one another, sliding directly over the image plane and displaceable independently of the inspection eyepieces, the measuring marks being rigidly connected with the marking implement, means for regulating the distance between the measuring marks, a double projector connected with the mirror stereoscope and adapted to project self-oriented images of the measuring pictures into the plane of the measuring marks, to be measured in place of the original pictures, and a parallel motion for moving the measuring marks and the marking implement collectively, to enable layer lines and situation lines to be obtained freehand and continuously from pairs of measuring pictures.

In testimony whereof I have signed my name to this specification.

REINHARD HUGERSHOFF.